Figure 1:
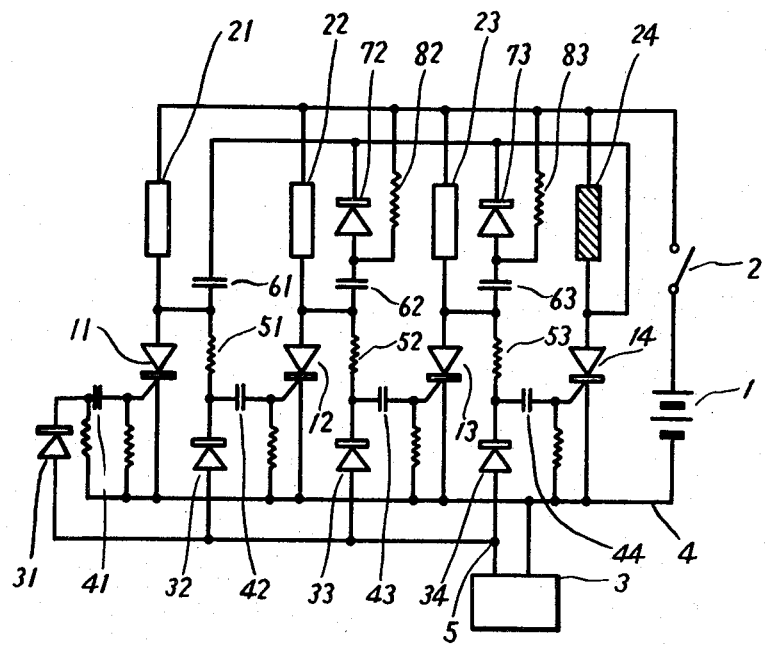

United States Patent
Okuhara

[15] 3,673,565
[45] June 27, 1972

[54] DIRECTION INDICATOR FOR AUTOMOBILE

[72] Inventor: Seiichi Okuhara, 5, Yoyogi 3-chome, Shibuya-ku, Tokyo, Japan

[22] Filed: Nov. 14, 1969

[21] Appl. No.: 876,853

[30] Foreign Application Priority Data

| Feb. 5, 1969 | Japan | 44/8128 |
| March 6, 1969 | Japan | 44/16469 |
| March 18, 1969 | Japan | 44/20071 |
| July 26, 1969 | Japan | 44/58769 |

[52] U.S. Cl. .................340/82, 307/220 B, 307/252 J, 307/252 M, 340/251
[51] Int. Cl. .................................................B60q 1/38
[58] Field of Search..............340/82; 307/252.53, 252.55

[56] References Cited

UNITED STATES PATENTS

| 3,456,131 | 7/1969 | Adem | 340/82 X |
| 3,474,410 | 10/1969 | Ivec | 340/82 |
| 3,484,626 | 12/1969 | Grafham | 340/82 X |
| 3,500,312 | 3/1970 | Stankovich | 340/67 |
| 3,113,241 | 12/1963 | Yonushka | 340/83 UX |
| 3,376,472 | 4/1968 | Taylor et al. | 340/83 X |
| 3,391,304 | 7/1968 | Fabry | 340/83 X |

FOREIGN PATENTS OR APPLICATIONS

| 1,154,970 | 6/1969 | Great Britain | 340/82 |

Primary Examiner—Kenneth N. Leimer
Attorney—Eugene E. Geoffrey, Jr.

[57] ABSTRACT

An automotive direction and stoplight signalling system using semi-conductor circuits to control the operation of the lights, the circuit operating a first set of two or more lights sequentially to indicate a turn to the right and a second set of lights to indicate a turn to the left. The circuit also includes means to operate all lights simultaneously to indicate that the vehicle is slowing down or stopping.

11 Claims, 5 Drawing Figures

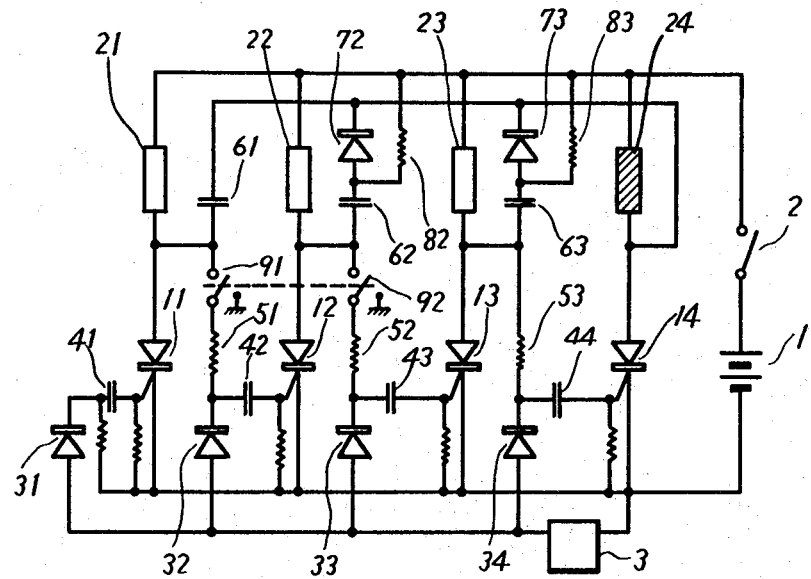
Fig. 3
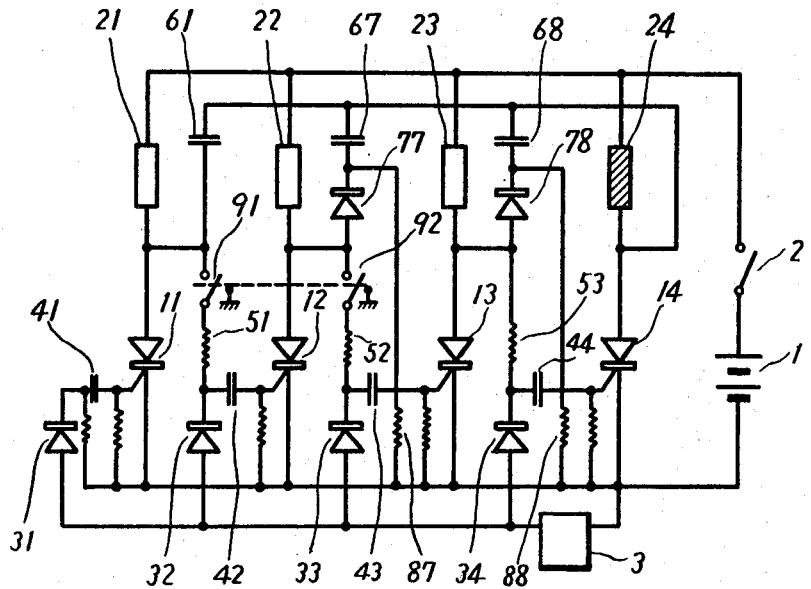
Fig. 4

DIRECTION INDICATOR FOR AUTOMOBILE

This invention relates to a direction indicator for automobiles in which a plurality of electric lamps arranged in a lateral direction are illuminated sequentially from the left to right or from the right to left. When the last lamp is illuminated all of the lamps are extinguished, and then the lamps are sequentially illuminated again from left to right or from right to left thereby indicating the travelling direction of an automobile.

Direction indicators for automobiles of types similar to those mentioned above have been used, but known indicators are arranged so that the contacts of the electric lamp circuit are mechanically closed and opened by a motor. Mechanical switches have not been found dependable because of contact abrasion and deterioration of the springs which results in a frequent or complete failure of the device to illuminate the electric lamps.

A main object of this invention is to provide a direction indicator for automobiles in which the illumination of a plurality of electric lamps is controlled in a contactless manner by means of silicon controlled rectifiers (hereinafter called SCR) so that the disadvantages of known direction indicators for automobiles are eliminated.

A second object of this invention is to provide a combined direction indicator and emergency indicator for automobiles in which the illumination of a plurality of electric lamps is controlled in a contactless manner by means of SCR's, and at the time of an emergency such as an abrupt stop all of the electric lamps are simultaneously and repeatedly flashed so that the occurrence of an emergency is indicated to the vehicles in the rear.

A third object of this invention is to provide a direction indicator for automobiles wherein the illumination of the plurality of electric lamps is controlled in contactless manner by SCR's, and should one or more of the electric lamps burn out an indication is provided on the dashboard.

A fourth object of this invention is to provide a direction indicator for automobiles wherein the illumination of a plurality of electric lamps is controlled in contactless manner by SCR's, and selection of the group of electric lamps to be illuminated at the time of turning to left or to right is done by a simple single pole double throw switch provided in a power source circuit which is operated by a direction indicating lever.

In the direction indicator for automobiles which accomplishes said main object of this invention, $n-1$ series circuits each consisting of an electric lamp, and an SCR and a series circuit consisting of a resistor and an SCR are respectively connected between the positive and a negative terminals of a power source. A capacitor is connected between an anode electrode of the SCR of the first stage and an anode electrode of the SCR of the $n$-th stage, a series circuit consisting of a capacitor and a diode is connected between the anode electrode of each SCR of the second stage through $n-1$-th stage and the anode electrode of the SCR of $n$-th stage respectively, and the coupling point of said capacitors and said diodes are connected to a reference potential point through individual resistors.

The direction indicators for automobiles which accomplish the second through fourth objects of this invention can be provided by merely applying some modification and/or addition to the direction indicator which accomplishes the main object of this invention as described above.

Therefore, the specific constructions and operation of the direction indicators will be more clearly understood from the detailed explanation of each embodiment shown in the drawings.

Figure 2:
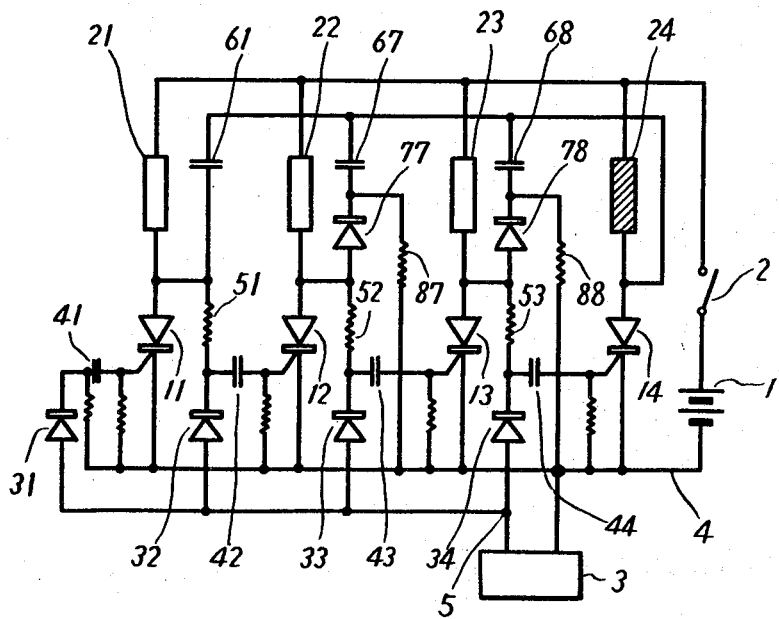
Figure 5:
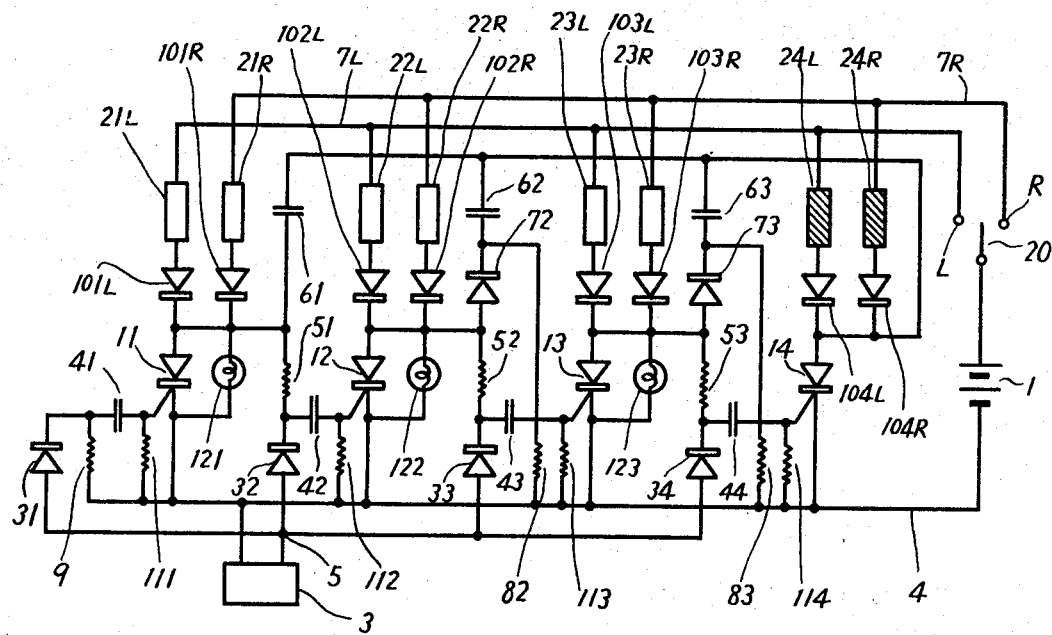

In the drawings:

FIG. 1 is a circuit diagram of one embodiment of the direction indicator for automobiles in accordance with this invention;

FIG. 2 is a circuit diagram of a second embodiment of said direction indicator; FIGS. 3 and 4 are circuit diagrams of third and fourth embodiments of said direction indicator; and FIG. 5 is a circuit diagram of a fifth embodiment of said direction indicator which is arranged so that the breakdown of the filament of an electric lamp is indicated on the dashboard of an automobile and left and right turn indications are accomplished by a simple switch.

Referring to FIG. 1, there is shown an example in which three electric lamps 21, 22, and 23 are sequentially illuminated. One end of each of the filaments of three electric lamps 21, 22, and 23 is separately connected to the anode electrodes of SCR 11, 12, and 13, and the other end is connected to the positive terminal of a power source 1 through a switch 2. A resistor 24 is connected between the anode electrode of a SCR 14 and the switch 2.

Cathode electrodes of the SCR 11, 12, 13 and 14 are connected to a common negative terminal line 4. The gate electrode of the SCR 11 is connected to an output terminal 5 of a trigger pulse generator 3 through a capacitor 41 and a diode 31 which are connected in series. Similarly, the gate electrode of the SCR 12 is connected through a capacitor 42 and a diode 32, the gate electrode of the SCR 13 is connected through a capacitor 43 and a diode 33 and the gate electrode of the SCR 14 is connected through a capacitor 44 and a diode 34 and all of the diodes are connected to the output terminal 5 of the trigger pulse generator 3 respectively.

The coupling point of the capacitor 42 and the diode 32, that is the cathode electrode of the diode 32 is connected to the anode electrode of the SCR 11 of the adjacent stage through a trigger pulse controlling resistor 51, the coupling point of the capacitor 43 and the diode 33 is connected to the anode electrode of the SCR 12 through a trigger pulse controlling resistor 52, and the coupling point of the capacitor 44 and the diode 34 is connected to the anode electrode of the SCR 13 through a trigger pulse controlling resistor 53. However, the coupling point of the capacitor 41 which is connected to the gate electrode of the SCR 11 of the first stage and the diode 31 is connected to the negative terminal line 4 through a resistor.

A capacitor 61 is connected between the anode electrode of the first stage SCR 11 and the a node electrode of the last stage SCR 14. A series circuit of a capacitor 62 and a diode 72 is connected between the anode electrode of the second stage SCR 12 and the anode electrode of the last stage SCR 14, and similarly a series circuit of a capacitor 63 and a diode 73 is connected between the anode electrode of the third stage SCR 13 and the anode electrode of the last stage SCR 14. The coupling point of the capacitor 62 and the diode 72 and the coupling point of the capacitor 63 and the diode 73 are respectively connected through resistors 82 and 83 to the positive terminal of the power source.

The trigger pulse generator 3 may be a known pulse generator such as a circuit in which a unijunction transistor is used for the generation of periodic pulses and which produces an output of a certain magnitude.

The operation of the direction indicator for automobiles in accordance with the first embodiment will now be explained.

First, the switch 2 is closed so that a voltage from the power source 1 is applied to each of the series circuits of the electric lamps 21, 22, 23, and the SCR's 11, 12, 13, and the series circuit of the resistor 24 and the SCR 14, and at the same time the trigger pulse generator 3 is put into an operation.

As none of the SCR's is conducting at first, the cathode electrodes of the diodes 32, 33, and 34 are biased by the resistors 51, 52, and 53 to a voltage equal to the anode voltage of the SCR. Accordingly, even when a trigger pulse having a peak voltage value lower than said bias voltage is applied thereto from the trigger pulse generator 3, said trigger pulse cannot reach to the gate electrodes of the SCR 12, 13, and 14, respectively.

However, as a positive bias is not applied to the cathode electrode of the diode 31, the first trigger pulse passes through the diode 31 and reaches the gate electrode of the SCR 11. Thereby, the SCR 11 conducts due to the first trigger pulse, and thereby the electric lamp 21 is illuminated.

Due to the conduction of the SCR 11 the cathode voltage of the diode 32 becomes almost zero, and, therefore, the second trigger pulse can pass through the diode 32 causing the second stage SCR 12 to conduct, and thereby the electric lamp 22 is illuminated. Similarly, the third trigger pulse causes the third stage SCR 13 to conduct to cause the electric lamp 23 to be illuminated.

Since, at this time, the voltages of the anode electrodes of the second stage and the third stage SCR's 12 and 13 become substantially zero, the capacitors 62 and 63 are charged relatively slowly through the resistors 82 and 83. Furthermore, the capacitor 61 connected to the anode electrode of the first stage SCR 11 is also charged through the resistor 24.

Next, when fourth trigger pulse is applied and thereby the fourth stage SCR 14 conducts, the voltage of the anode electrode of the SCR 14 becomes substantially zero, and the charges stored in the capacitors 61, 62, and 63 are therefore simultaneously discharged through said SCR 14. To effect this discharge the voltages of the anode electrodes of the SCR 11, 12, and 13 are reversed in polarity for a short period of time, thereby the SCR 11, 12, and 13 are disabled, and the illumination of all of the electric lamps 21, 22, and 23 is terminated and the circuit is returned to the original state.

However, as the SCR 14 remains conductive and the voltage of its anode electrode is substantially zero, the capacitor 61 is reversely charged so that the anode electrode of the SCR 11 is positive and the anode electrode of the SCR 14 is negative.

When the trigger pulse is produced again, the SCR 11 conducts illuminating the electric lamp 21 and at the same time causing the charge stored in the capacitor 61 to be dissapated, thereby the voltage of the anode electrode of the SCR 14 becomes negative for a short period of time, and the SCR 14 is disabled. The operation as described above is repeated, and the lamps 21, 22, and 23 are repeatedly and sequentially illuminated.

Next, the reason for the presence of the diodes 72 and 73 will be explained. The diode 72 works to prevent the discharge of the capacitor 61 through the capacitor 62 and the conducting SCR 12 when the SCR is conducting, and similarly the diode 73 works to prevent the discharge of the capacitors 61 and 62 through the capacitor 63 and the SCR 13 when the SCR is conducting.

The resistors 82 and 83 are for charging the capacitors 62 and 63 which are discharged due to the conduction of the SCR 14, and said charging is done without going through the diodes 72 and 73. Accordingly, the charging of the capacitors 62 and 63 is done through the resistors 82 and 83 only, and their discharging is done through the diodes 72 and 73 only. In this case, it is necessary to establish the charging time of the capacitors 62 and 63 sufficiently longer compared to their discharging time, and therefore the resistors 82 and 83 have a relatively large value.

If the diodes 72 and 73 were not present, the SCR's would conduct one at a time. In other words, suppose that the SCR 12 conducts subsequent to the SCR 11 for example, the anode electrode of the SCR 11 is instanteously made negative due to the discharge of the capacitor 61, and thereby the SCR would be disabled. Thus, only one electric lamp is illuminated at a time similar to the operation of a ring counter, and a plurality of electric lamps could not be illuminated simultaneously.

As explained above, the diodes 72 and 73 cause a plurality of electric lamps to be illuminated simultaneously and in addition, all of the lamps can be extinguished simultaneously.

The direction indicator for automobiles shown in FIG. 2 will now be explained.

In the direction indicator shown in FIG. 2, the construction of the series circuit of a diode and a capacitor between the anode electrode of the SCR 12 and the anode electrode of the SCR 14 and the like circuit between the anode electrode of the SCR 13 and the anode electrode of the SCR 14 is a little different from that of FIG. 1, but the remainder is the same.

While in the example of FIG. 1 the capacitors 62 and 63 are each connected to the anode electrode side of each of the SCR's 12 and 13 and the diodes 72 and 73 are connected to the anode electrode of the SCR 14, in the example shown in FIG. 2 the positions of said capacitors and said diodes are interchanged.

In other words, a series circuit of a capacitor 67 and a diode 77 is connected between the anode electrode of the SCR 12 and the anode electrode of the SCR 14. The coupling point of the diode 77 and the condenser 67 is connected to the negative terminal side of the power source through a resistor 87 having a relatively large value. Similarly, a series circuit of a capacitor 68 and a diode 78 is connected between the anode electrode of the SCR 13 and the anode electrode of the SCR 14. The coupling point of the capacitor 68 and the diode 78 is connected to the negative terminal side of the power source through a resistor 88 having a relatively large value.

The operation of the direction indicator shown in FIG. 2 is completely the same as that shown in FIG. 1. When the switch 2 is closed, the electric lamps 21, 22, and 23 are illuminated one after another, and when all of the electric lamps are illuminated all are extinguished, and then again the electric lamps are illuminated in described same order as the above.

The reason for the provision of the diodes 77 and 78 is same as the reason for the provision of the diodes 72 and 73 of FIG. 1. More specifically, if the diode 77 is not present, the electric charge in the capacitor 61 is discharged through the capacitor 67 and the SCR 12 when the SCR 12 conducts. Thereby the anode electrode of the SCR 11 is made negative temporarily and the SCR 11 is disabled. Similarly, if the diode 78 is not present, the SCR's 11 and 12 are disabled when the SCR 13 conducts. Accordingly, only one electric lamp is illuminated at one time, and a plurality of electric lamps cannot be illuminated simultaneously.

The resistors 87 and 88 constitute a charging circuit for the capacitors 67 and 68, and the resistors are chosen to have a relatively large value so that the charging time is longer compared to the discharging time.

As the direction indicator of the said second embodiment is the same as that of the first embodiment in that it does not have mechanical contacts, trouble is minimized reliability is high and it operates with a high degree of stability all the time.

Next, the direction indicator shown in FIGS. 3 and 4 which can indicate an emergency stop will be explained.

The example shown in FIG. 3 is so arranged that a switch 91 is interposed between the anode electrode of the SCR 11 of the first stage and the resistor 51 of FIG. 1 and a switch 92 is interposed between the anode electrode of the SCR 12 of the second stage and the resistor 52 thereof. Furthermore, the direction indicator shown in FIG. 4 is so arranged that the switch 91 is interposed between the anode electrode of the SCR 11 of the first stage of FIG. 2 and the resistor 51, and the switch 92 is interposed between the anode electrode of the SCR 12 of the second stage and the resistor 52 thereof. If desired, it may be preferable to mechanically interlock the switches 91 and 92.

The following description will be directed only to the matters relating to the switches 91 and 92 for the purpose of simplification.

When the switches 91 and 92 are closed the electric lamps 21, 22 and 23 will be illuminated in sequence as described in connection with the circuits shown in FIGS. 1 and 2. When the three lamps are illuminated, the next successive pulse of the generator will render the SCR 14 conductive and thereby simultaneously extinguish all three lamps. The next successive pulse from the generator will then render the SCR 11 conductive to illuminate lamp 21 and, at the same time, render the SCR 14 non-conductive so that the three lamps will be sequentially illuminated and then simultaneously extinguished to indicate the travelling direction of the automobile.

Operation of the direction indicators shown in FIGS. 3 and 4 at the time of indicating an emergency stop will now be explained. In this case, the two switches 91 and 92 are open, and the positive bias is not applied to the cathode electrodes of the diodes 32 and 33. But, it should be noted that as the cathode electrode of the diode 34 only is connected to the anode electrode of the adjacent SCR 13 through the resistor 53, the cathode electrode of said diode 34 at the time of nonconduction of the SCR 13 is always positive biased.

Now, the switch 2 is closed so that the voltage from the power source 1 is applied to each of the series circuits of the electric lamp 21 and the SCR 11, the electric lamp 22 and the SCR 12, the electric lamp 23 and the SCR 13, and the resistor 24 and the SCR 14, and at the same time the trigger pulse generator 3 is operated.

As at the first none of the SCR's is conducting, the cathode electrode of the diode 34 is being biased in the same manner as the anode electrode of the SCR 13 by the resistor 53 as mentioned above. The first pulse supplied by the trigger pulse generator 3 reaches the gate electrodes of the SCR's 11, 12 and 13 simultaneously through diodes 31, 32, and 33 causing these SCR's to conduct simultaneously and thereby causing all of the electric lamps 21, 22, and 23 to be illuminated at once.

As the anode electrodes of the SCR's 11, 12, and 13 at this time are substantially at zero potential, the positive bias with respect to the cathode electrode of the diode 34 is removed. When the second trigger pulse is then supplied, this pulse goes through the diode 34 to reach the gate electrode of the SCR 14 causing the SCR 14 to conduct. As the voltage of the anode electrode of the SCR 14 at this time becomes substantially zero, the charges stored in the capacitors 61, 62 and 63 are simultaneously discharged through the SCR 14 making the voltages of the anode electrodes of the SCR's 11, 12, and 13 negative for a short period of time. Thus these SCR's are disabled and the electric lamps 21, 22, and 23 are extinguished. When the third trigger pulse is supplied, the SCR's 11, 12, and 13 conduct again causing the electric lamps 21, 22, and 23 to become illuminated simultaneously, and the SCR 14 is disabled due to the discharge of the capacitor 61.

The operation explained above is repeated in order to repeatedly illuminate all of the electric lamps 21, 22, and 23 simultaneously. The group of the SCR's 11, 12, and 13 and the SCR 14 cooperate and perform a flip-flop-circuit-like operation.

If desired, the switches 91 and 92 when opened as shown in the drawing can have their movable members grounded so that the cathode potentials of the diodes 32 and 33 are positively held at zero potential.

The example shown in FIG. 5 will be explained next. Suppose that the electric lamps 21, 22, and 23 shown in FIGS. 1 through 4 are the lamps to be used at the time of left turn. For the indication of right turn it is necessary to connect three more electric lamps (not shown) to the SCR 11, 12 and 13 respectively. For this additional arrangement at least three switches in addition to the switch 2 are required for switching these electric lamps. In the case of a mechanical switch, even if said switches are consolidated into one switch having multi-contact points, there remains the aforementioned cause of trouble due to many mechanical contact points.

In the direction indicator shown in FIG. 5, a simple single pole double throw switch is employed for the selection of the lamp group to be used for the left turn and the lamp group to be used for the right turn. Further, in this example, should a filament breakdown occur it is indicated by the indicating lamp provided on the dashboard.

Since the basic circuit of said direction indicator of FIG. 5 is the same as that shown in FIG. 2, the following description will be directed only to the portions which differ from FIG. 2.

As is shown in the drawing, two lines 7L and 7R extend from the positive terminal of the power source 1 through the single pole double throw switch 20. There are connected respectively a series circuit of an electric lamp 21L and an interference preventing diode 101L between the line 7L and the anode electrode of the SCR 11, a series circuit of an electric lamp 22L and an interference preventing diode 102L between the line 7L and the anode electrode of the SCR 12, and a series circuit of an electric lamp 23L and an interference preventing diode 103L between the line 7L and the anode electrode of the SCR 13. Similarly, there are connected respectively between the line 7R and each of the anode electrodes of the SCR's 11, 12 and 13 a series circuit of an electric lamp 21R and an interference preventing diode 101R, a series circuit of an electric lamp 22R and an interference preventing diode 102R, and a series circuit of an electric lamp 23R and an interference preventing diode 103R. Further, a series circuit consisting of a resistor 24L and a diode 104L is connected between the line 7L and the anode electrode of the Scr 14, and similarly a series circuit consisting of a resistor 24R and a diode 104R is connected between the line 7R and the anode electrode of the SCR 14.

Between the anode electrode and the cathode electrode of each of the SCR's 11, 12 and 13 the operation indicating lamps 121, 122, and 123 are connected respectively. It is preferable that those indicating lamps are of relatively small power consumption and of high internal resistance. These lamps are preferably provided on the dashboard.

Operation of the abovementioned direction indicator will now be explained.

At the time of a left turn, the switch 20 is connected to the contact point L so that a voltage is applied to the line 7L and at the same time the trigger pulse generator 3 is operated.

As was explained previously in connection with Fig. 1, when the first trigger pulse from the trigger pulse generator 3 is supplied, the pulse passes through the diode 31 only and reaches the SCR 11 causing the SCR 11 to conduct and thereby causing the electric lamp 21L to become illuminated. As at this time the voltage between the anode electrode and the cathode electrode of the SCR 11 becomes substantially zero, the operation indicating lamp 121 is extinguished. The second trigger pulse causes the SCR 12 to conduct, the electric lamp 22L is illuminated, and the operation indicating lamp 122 is extinguished. With the third trigger pulse the SCR 13 conducts the electric lamp 23L is illuminated, and the operation indicating lamp 123 is extinguished. With the fourth trigger pulse the SCR 14 is caused to conduct thereby all of the SCR's 11, 12 and 13 are disabled and all of the electric lamps are extinguished and the operation indicating lamps 121, 122 and 123 are illuminated again. The next trigger pulse causes the SCR 11 to conduct again and the lamp 121 is extinguished. Further, the SCR 14 is thereby disabled. The operation of the electric lamps is repeated by the repetition of the above-mentioned operation.

In the above-mentioned example, when a breakdown of a filament or a bad contact of any of the electric lamps occurs the operation of the indicating lamps becomes irregular or a specific lamp is not illuminated, and thereby any difficulty or an abnormal condition relating to the electric lamps can be discovered immediately.

To energize the electric lamps 21R, 22R and 23R to indicate a right turn, the switch 20 is connected to the side of the contact point R in order to apply a voltage to the line 7R. The operation thereof is completely the same as that of the left turn.

The resistors 24L and 24R are connected to the anode electrode of the final stage diodes 104L and 104R. If desired, these resistors can be substituted with electric lamps for the front or the side illumination.

The interference preventing diode is inserted in series with each electric lamp. This is to prevent mutual interference due to a current flowing through the line 7L or 7R to the other group of the electric lamps when either one of the groups of the electric lamps is being operated. Due to the presence of the interference preventing diode the operation of the left side electric lamps and the right side electric lamps can be completely isolated without the need for a switch for each electric lamp.

The direction indicator of the fifth example, as will be clearly seen from the foregoing explanation, enables the switching of the left side group of the electric lamps and the right side group of the electric lamps by means of a single simple switch 20, and at the same time alerts the driver to a contact and other trouble relating to the electric lamps.

If desired, the direction indicator of the fifth example may be arranged in a manner similar to the circuit of FIG. 1, and the switch shown in FIG. 3 or 4 may be further provided.

The operation indicating lamps shown in FIG. 5 are of course applicable to the examples shown in FIGS. 1 through 4. Further, it is preferable to have the power source switch 2 and the switch 20 related to the direction indicating lever so that they are switched by the operation of said lever.

Needless to say, the circuit construction of all of the abovementioned embodiments of this invention can be modified without deviating from the spirit of this invention.

What is claimed is:

1. A direction indicator circuit for automobiles comprising n parallel stages wherein n is at least equal to 3, each of the first through the $(n-1)$th stages including a series circuit consisting of an electric lamp and a silicon controlled rectifier having an anode and cathode, the $n$-th stage including a series circuit consisting of a resistor and a silicon controlled rectifier, means connecting said n stages in parallel and to a DC source, each of said rectifiers having a gate electrode, first circuit means including a capacitor connecting each stage with the gate electrode of the next stage to prevent operation of the second through the $n$-th stages until each preceding stage has fired, a pulse generator, connections between said generator and each of said gate electrodes, the successive pulses of said generator rendering said stages successively conductive, and second circuit means interconnecting said $n$-th stage with said preceding stages to render all of the rectifiers of the last said stages non-conductive upon the occurrence of the $n$-th pulse of a series of pulses and upon the occurrence of the first pulse of the successive series of pulses rendering the rectifier in the first stage conductive and the rectifier in the $n$-th stage nonconductive, whereby the application of a series of pulses to said gate electrodes will cause the rectifiers of successive stages to become conductive upon the application of successive pulses and upon the application of the $n$-th pulse of the series the rectifiers in the first through the $(n-1)$th stages are rendered non-conductive and upon repetition of said series of pulses conduction of the rectifier in the first stage renders the rectifier in the $n$-th stage non-conductive, said rectifiers in the first through the $(n-1)$th stages each illuminating its associated lamp when it is rendered conductive.

2. A direction indicator circuit according to claim 1 wherein said second circuit means includes a capacitor connected between each anode of the first through the $(n-1)$th stages and the anode of the $n$-th stage and resistive means interconnected between each capacitor and the power source for charging said capacitors, the charging time for said capacitors being greater than the discharging time when the rectifier in said $n$-th stage is rendered conductive.

3. A direction indicator circuit according to claim 2 wherein said connections between said pulse generator and said gate electrodes each includes a diode in series with said capacitor and a resistor is connected between the anode of each of the rectifiers of the first through the $(n-1)$th stages and the junction of the last said capacitor and diode connected to the gate of the successive stage.

4. A direction indicator circuit according to claim 2 wherein said second circuit means further includes a diode connected in series with said capacitor.

5. A direction indicator circuit according to claim 2 wherein each of said resistive means in the first through the $(n-2)$th stages includes a switch connected in series therewith.

6. A direction indicator circuit according to claim 1 including an indicating lamp connected across the rectifiers of the first through the $(n-1)$th stages.

7. A direction indicator circuit comprising positive and negative terminals for connection to a DC source, a single pole double throw switch having a movable arm connected to said positive terminal, n stages wherein n is greater than 2 connected between the fixed contacts of said switch and said negative terminal, each of the first through the $(n-1)$th stages including a silicon controlled rectifier having a cathode connected to said negative terminal and a pair of series circuits each consisting of an electric lamp and a series connected diode each connected between one of said fixed contacts and the anode of said silicon controlled rectifier, the $n$-th including a silicon controlled rectifier having a cathode connected to said negative terminal and a pair of series circuits each consisting of a resistor and a diode connected between one of said fixed contacts and the anode of the last said silicon controlled rectifier, a trigger pulse generator producing a train of pulses, connections between said generator and the gate electrode of each silicon controlled rectifier, a capacitor having one end connected to the anode of each of the first through the $(n-1)$th stages and the other end connected to the anode of the silicon controlled rectifier of the $n$th stage, a conductive impedance connected between said one end of each capacitor and said negative terminal to provide a charging time greater than the discharging time when said rectifier of the $n$-th stage is conducting.

8. A direction indication circuit according to claim 7 wherein said connections between said generator and said gates each includes a series connected capacitor and diode and a resistor connected between each junction of the last said capacitor and diode of the second through the $n$-th stages to the silicon controlled rectifier of the preceding stage.

9. A direction indication circuit according to claim 8 including a resistor connected between each gate electrode and said negative terminal.

10. A direction indication circuit according to claim 7 wherein a trouble indicating lamp is connected across the silicon controlled rectifier of each of the first through the $(n-1)$th stages.

11. A direction indicator circuit according to claim 7 wherein said resistors in the pair of series circuits in said $n$-th stage are electric lamps.

* * * * *